(12) United States Patent
Kojima (10) Patent No.: US 8,820,299 B2
(45) Date of Patent: Sep. 2, 2014

(54) FUEL INJECTION CONTROL SYSTEM FOR INTERNAL COMBUSTION ENGINE

(75) Inventor: Susumu Kojima, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/499,469

(22) PCT Filed: Apr. 27, 2011

(86) PCT No.: PCT/JP2011/060319
§ 371 (c)(1),
(2), (4) Date: Mar. 30, 2012

(87) PCT Pub. No.: WO2012/147186
PCT Pub. Date: Nov. 1, 2012

(65) Prior Publication Data
US 2014/0053812 A1 Feb. 27, 2014

(51) Int. Cl.
 *F02M 69/54* (2006.01)
 *F02D 41/22* (2006.01)
 *F02M 63/02* (2006.01)
 *F02D 41/30* (2006.01)
 *F02D 41/38* (2006.01)
 *F02D 41/40* (2006.01)
 *F02M 39/00* (2006.01)
 *F02B 77/08* (2006.01)

(52) U.S. Cl.
CPC ......... *F02D 41/221* (2013.01); *F02M 63/0245* (2013.01); *F02D 41/3082* (2013.01); *F02D 41/3845* (2013.01); *F02D 41/3854* (2013.01); *F02D 41/406* (2013.01); *F02M 63/025* (2013.01); *F02D 2041/224* (2013.01); *F02D 2041/226* (2013.01); *F02D 2200/0614* (2013.01); *Y02T 10/44* (2013.01); *F02M 39/005* (2013.01)

USPC .......................... 123/457; 123/198 D (58) Field of Classification Search
CPC ............ F02D 41/3845; F02D 41/3854; F02D 2941/224
USPC .............. 123/457, 198 D, 456, 447; 701/102, 701/114; 73/114.43
See application file for complete search history.

(56) References Cited

U.S. PATENT DOCUMENTS

| 6,138,638 | A * | 10/2000 | Morikawa ...................... 123/295 |
| 2006/0021598 | A1 | 2/2006 | Nomura |
| 2007/0209430 | A1* | 9/2007 | Awano et al. ............... 73/119 A |
| 2011/0162622 | A1 | 7/2011 | Kojima et al. |

FOREIGN PATENT DOCUMENTS

| JP | 2003-222060 A | 8/2003 |
| JP | 2005-307931 A | 11/2005 |

(Continued)

*Primary Examiner* — Mahmoud Gimie
(74) *Attorney, Agent, or Firm* — Sughrue, Mion, PLLC (57) ABSTRACT

An object of the invention is to detect, in a fuel injection control system for an internal combustion engine equipped with a low pressure fuel pump and a high pressure fuel pump, a failure in the fuel injection system including the high pressure fuel pump with high accuracy. To achieve the object, in the fuel injection control system for an internal combustion engine equipped with a low pressure fuel pump and a high pressure fuel pump according to the invention, when a discharge failure in the high pressure fuel pump is detected, the discharge pressure of the low pressure fuel pump is increased. Then, it is determined whether a discharge failure in the high pressure fuel pump occurs or not. If occurs, it is concluded that the fuel injection system including the high pressure fuel pump is in failure.

10 Claims, 7 Drawing Sheets

(56) References Cited

FOREIGN PATENT DOCUMENTS

| | | |
|---|---|---|
| JP | 2006-037920 A | 2/2006 |
| JP | 2009-103059 A | 5/2009 |
| JP | 2010-071224 A | 4/2010 |
| JP | 2010-116845 A | 5/2010 |
| JP | 2010-185308 A | 8/2010 |

* cited by examiner

FUEL INJECTION CONTROL SYSTEM FOR INTERNAL COMBUSTION ENGINE

CROSS REFERENCE TO RELATED APPLICATIONS

This application is a National Stage of International Application No. PCT/JP2011/060319 filed Apr. 27, 2011, the contents of all of which are incorporated herein by reference in their entirety.

TECHNICAL FIELD

The present invention relates to a fuel injection control system for an internal combustion engine equipped with a low pressure fuel pump for pumping up fuel from a fuel tank and a high pressure fuel pump for boosting the pressure of the fuel discharged from the low pressure pump.

BACKGROUND ART

There has been developed a control system for an in-cylinder injection internal combustion engine that has a fuel injection valve that injects fuel into a cylinder, a high pressure pump that boosts the pressure of fuel pumped up from a fuel tank, a high pressure fuel passage for supplying fuel discharged from the high pressure pump to the fuel injection valve, fuel pressure estimation means for estimating the fuel pressure in the high pressure fuel passage by model calculation, a fuel pressure sensor that measures the fuel pressure in the high pressure fuel passage, and failure determination means for determining that a high pressure fuel system ranging from the high pressure pump to the fuel injection valve is in failure when the difference between the fuel pressure estimated by the fuel pressure estimation means and the fuel pressure measured by the fuel pressure sensor exceeds an error range (see, for example, Patent Document 1).

In a technology described in Patent Document 2, in an internal combustion engine equipped with a low pressure fuel pump that pumps up fuel from a fuel tank and a high pressure fuel pump that boosts the pressure of fuel discharged from the low pressure fuel pump, the high pressure pump is controlled by open control and a closed loop control value, and it is determined that cavitation occurs in the second pump when the control value exceeds a limit value.

In a technology disclosed in Patent Document 3, a failure in a high pressure fuel pump is detected based on a change in the pressure of fuel discharged from the high pressure fuel pump at the time when an electromagnetic spindle valve of the high pressure fuel pump is actuated.

In the technology described in Patent Document 4, in an internal combustion engine equipped with a low pressure fuel pump that pumps up fuel from a fuel tank and a high pressure fuel pump that boosts the pressure of fuel discharged from the low pressure fuel pump, if the duty cycle of the high pressure fuel pump is not smaller than a predetermined value, the discharge pressure (or feed pressure) of the low pressure fuel pump is raised.

PRIOR ART DOCUMENT

Patent Document

Patent Document 1: Japanese Patent Application Laid-Open No. 2009-103059
Patent Document 2: Japanese Patent Application Laid-Open No. 2003-222060
Patent Document 3: Japanese Patent Application Laid-Open No. 2006-037920
Patent Document 4: Japanese Patent Application Laid-Open No. 2010-071224

DISCLOSURE OF THE INVENTION

Problem to be Solved by the Invention

In a fuel injection control system for an internal combustion engine equipped with a low pressure fuel pump and a high pressure fuel pump, a discharge failure in the high pressure fuel pump might occur not only when the fuel injection system including the high pressure fuel pump is in failure but also when fuel vapor is generated in a fuel passage extending from the low pressure fuel pump to the high pressure fuel pump.

However, when a discharge failure occurs in the high pressure fuel pump, it is not possible in the methods disclosed in the above-mentioned Patent Documents 1 to 4 to distinguish between whether the failure is caused by a failure in the fuel injection system or by fuel vapor.

The present invention has been made in view of the above fact, and an object of the present invention is to detect, in a fuel injection control system for an internal combustion engine equipped with a low pressure fuel pump and a high pressure fuel pump, a failure in the fuel injection system including the high pressure fuel pump with high accuracy.

Means for Solving the Problem

In the present invention, to solve the above-described problem, in a fuel injection control system for an internal combustion engine equipped with a low pressure fuel pump and a high pressure fuel pump, when a discharge failure in the high pressure fuel pump is detected, the discharge pressure of the low pressure fuel pump is increased. Then, it is determined whether a discharge failure in the high pressure fuel pump occurs or not. If occurs, it is concluded that the fuel injection system including the high pressure fuel pump is in failure.

Specifically, according to the present invention, a fuel injection control system for an internal combustion engine, in which fuel discharged from a low pressure fuel pump is supplied to a fuel injection valve with its pressure boosted by a high pressure fuel pump, comprises:

a fuel pressure sensor that measures the pressure of fuel discharged from said high pressure fuel pump;

a detection section that detects a discharge failure in said high pressure fuel pump, using as a parameter the amount of change in the measurement value of said fuel pressure sensor in relation to timing of operation of said high pressure fuel pump;

a pressure increasing section that increases the discharge pressure of said low pressure fuel pump when said detection section detects a discharge failure in said high pressure fuel pump; and a determination section that determines that a fuel injection system including said high pressure fuel pump is in failure if said detection section detects a discharge failure in said high pressure fuel pump again after the discharge pressure of said low pressure fuel pump is increased by said pressure increasing section.

According to the present invention, a discharge failure in the high pressure fuel pump is detected using as a parameter the measurement value of the fuel pressure sensor in relation to the operation timing (or discharge timing) of the high pressure fuel pump. For example, it is determined that a discharge failure occurs in the high pressure fuel pump if the measurement value of the fuel pressure sensor does not increase in synchronization with the operation timing of the high pressure fuel pump, or if the amount of increase in the measurement value is small.

A discharge failure in the high pressure fuel pump can occur not only when the fuel injection system including the high pressure fuel pump is in failure (e.g. when break in wire harness or binding of a movable part occurs) but also when fuel vapor is generated in a fuel passage extending from the low pressure fuel pump to the high pressure fuel pump (which passage will be hereinafter referred to as the "low pressure fuel passage").

In the case where the cause of a discharge failure is fuel vapor, the discharge failure in the high pressure fuel pump will be removed by increasing the discharge pressure of the low pressure fuel pump. On the other hand, in the case where the cause of a discharge failure in the high pressure fuel pump is a failure in the fuel injection system, the discharge failure will not be removed by increasing the discharge pressure of the low pressure fuel pump.

In the fuel injection control system for an internal combustion engine according to the present invention, when a discharge failure in the high pressure fuel pump is detected, the discharge pressure of the low pressure fuel pump is increased, and thereafter a process for detecting a discharge failure in the high pressure fuel pump is performed again. In this method, if a discharge failure in the high pressure fuel pump is detected again after the discharge pressure of the low pressure fuel pump has been increased, it may be determined that the fuel injection system including the high pressure fuel pump is in failure. On the other hand, if a discharge failure in the high pressure fuel pump is not detected after the discharge pressure of the low pressure fuel pump has been increased, it may be determined that fuel vapor is generated in the low pressure fuel passage.

Thus, according to the present invention, in a fuel injection control system equipped with a low pressure fuel pump and a high pressure fuel pump, a failure in the fuel injection system including the high pressure fuel pump can be detected with high accuracy. Moreover, according to the present invention, it is possible to distinguish whether the cause of a discharge failure in the high pressure fuel pump is a failure in the fuel injection system or fuel vapor in the low pressure fuel passage.

The present invention can effectively be applied also to an internal combustion engine equipped with a plurality of delivery pipes and high pressure fuel pumps. In some internal combustion engines equipped with a plurality of delivery pipes and high pressure fuel pumps, the plurality of delivery pipes are arranged to be in communication with each other, and a fuel pressure sensor is provided in only one of the plurality of delivery pipes.

In such internal combustion engines, the discharge pressure of all the high pressure fuel pumps is controlled using as a parameter the measurement value of the fuel pressure sensor. For example, the discharge pressure of all the high pressure fuel pumps is feedback-controlled so that the measurement value of the fuel pressure sensor becomes equal to a target value. In consequence, even when a discharge failure occurs in one or some of the high pressure fuel pumps, the measurement value of the fuel pressure sensor might converge to the target value. If this is the case, a discharge failure in the high pressure fuel pump(s) might be difficult to detect.

On the other hand, the detection section according to the present invention detects a discharge failure using as a parameter the amount of change in the measurement value of the fuel pressure sensor in relation to the operation timing of each high pressure fuel pump. Therefore, a discharge failure in each high pressure fuel pump can be detected individually. Consequently, a situation in which one or some of the high pressure fuel pumps continue to operate while suffering from a discharge failure can be prevented.

The fuel injection control system for an internal combustion engine according to the present invention may further comprise a compensation section that makes a target discharge pressure for the low pressure fuel pump higher if the detection section does not detect again a discharge failure in the high pressure fuel pump after the discharge pressure of the low pressure fuel pump is increased by the pressure increasing section. In other words, the fuel injection control system for an internal combustion engine according to the present invention may further comprise a compensation section that makes a target discharge pressure for the low pressure fuel pump higher if a discharge failure in the high pressure fuel pump is caused by fuel vapor in the low pressure fuel passage. In this case, since fuel vapor in the low pressure fuel passage is removed, the discharge failure in the high pressure fuel pump can be removed.

The system according to the present invention may further comprise a control section that feedback-controls a drive signal for the high pressure fuel pump in such a way that the discharge pressure of the high pressure fuel pump converges to a target pressure, and a correction section that performs increasing correction or decreasing correction of the target discharge pressure for the low pressure fuel pump in relation to the value of a correction term used in the feedback control.

In this case, after the target discharge pressure for the low pressure fuel pump is made higher by the compensation section, the correction section may make the amount of decreasing correction per unit time smaller than that before the target discharge pressure is made higher. After the target discharge pressure for the low pressure fuel pump is made higher by the compensation section, the correction section may make the amount of increasing correction per unit time larger than that before the target discharge pressure is made higher. After the target discharge pressure for the low pressure fuel pump is made higher by the compensation section, the correction section may make a lower limit of the target discharge pressure for the low pressure fuel pump higher than that before the target discharge pressure is made higher.

If the amount of decreasing correction, the amount of increasing correction or the lower limit is set in the above-described manner, fuel vapor will be hard to be generated in the low pressure fuel passage. Consequently, the probability of the occurrence of a discharge failure in the high pressure fuel pump will become lower. In consequence, the measurement value of the fuel pressure sensor will become more prone to converge to the target value, and the fuel injection quantity will become harder to deviate from a target fuel injection quantity.

Advantageous Effect of the Invention

According to the present invention, in a fuel injection control system for an internal combustion engine equipped with a low pressure fuel pump and a high pressure fuel pump, a failure in the fuel injection system including the high pressure fuel pump can be detected with high accuracy.

THE BEST MODE FOR CARRYING OUT THE INVENTION

In the following, specific embodiments of the present invention will be described with reference to the drawings. The dimensions, materials, shapes and relative arrangements etc. of the components that will be described in connection with the embodiments are not intended to limit the technical scope of the present invention only to them, unless particularly stated.

Embodiment 1

Figure 1:
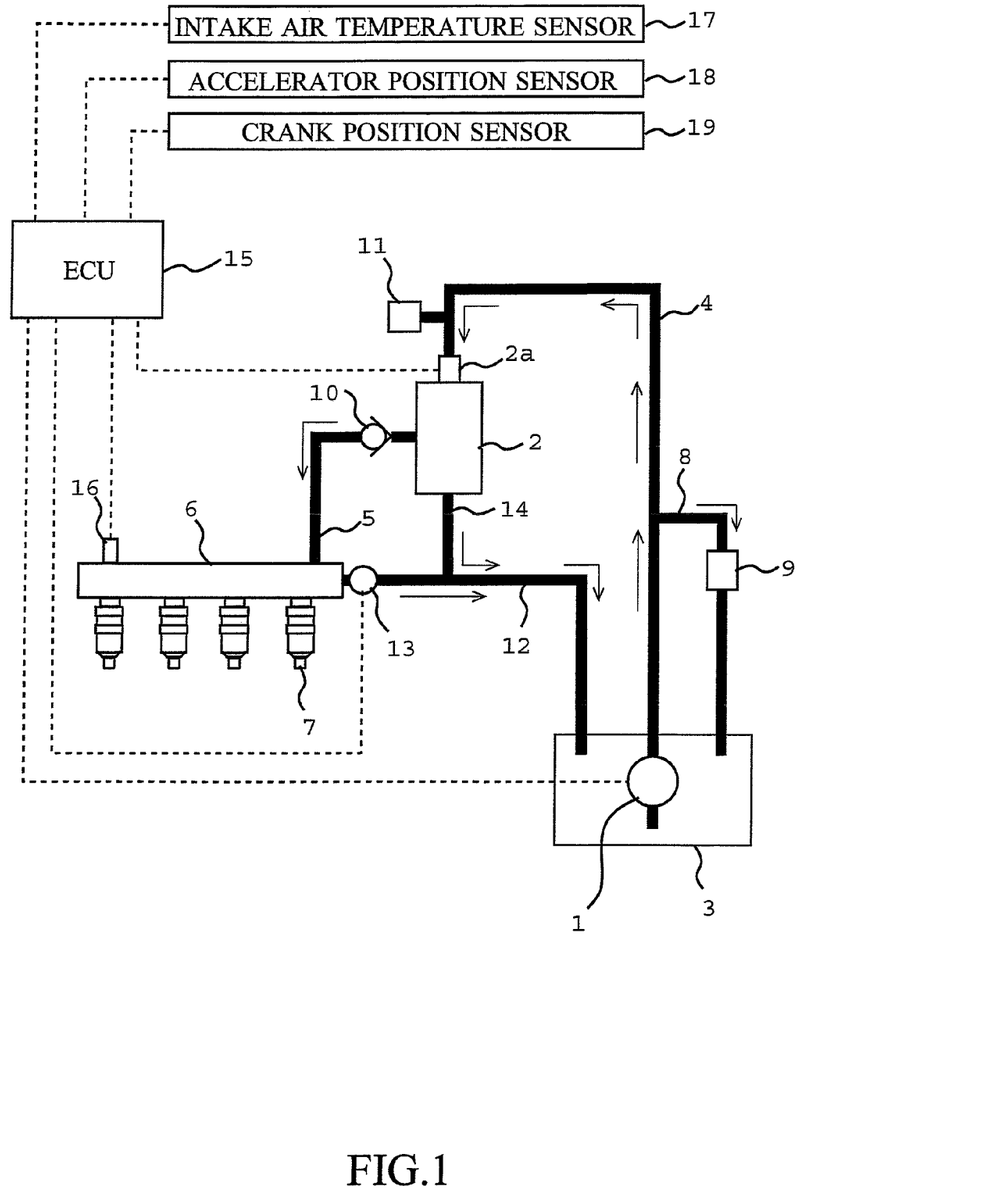
FIG. 1 is a diagram showing the basic configuration of a fuel injection control system for an internal combustion engine according to a first embodiment.

A first embodiment of the present invention will be described with reference to FIGS. 1 to 4. FIG. 1 is a diagram showing the basic configuration of a fuel injection control system for an internal combustion engine according to the present invention. The fuel injection control system shown in FIG. 1 is applied to an inline four-cylinder internal combustion engine and includes a low pressure fuel pump 1 and a high pressure fuel pump 2. The number of cylinders in the internal combustion engine is not limited to four, but it may be five or more or three or less.

The low pressure fuel pump 1 is an electrically driven turbine pump (Westco pump), which pumps up fuel stored in a fuel tank 3. Fuel discharged from the low pressure fuel pump 1 is supplied to the inlet port of the high pressure fuel pump 2 through a low pressure fuel passage 4.

The high pressure fuel pump 2 is used to boost the pressure of fuel discharged from the low pressure fuel pump 1. The high pressure fuel pump 2 is a reciprocating pump (plunger pump) that is driven by the power of the internal combustion engine (e.g. by means of rotational force of a cam shaft). An inlet valve 2a for switching between opening and closing of the inlet port is provided at the inlet port of the high pressure fuel pump 2. The inlet valve 2a is an electromagnetic valve mechanism that changes the discharge rate of the high pressure fuel pump 2 by changing the opening/closing timing relative to the position of the plunger. To the discharge port of the high pressure pump 2 is connected the base end of a high pressure fuel passage 5. The terminal end of the high pressure fuel passage 5 is connected to a delivery pipe 6.

A plurality of fuel injection valves 7 are connected to the delivery pipe 6. High pressure fuel pumped to the delivery pipe 6 by the high pressure fuel pump 2 is distributed to the fuel injection valves 7. The fuel injection valves 7 are valve mechanisms that inject fuel directly into the cylinders of the internal combustion engine.

In cases where the internal combustion engine is equipped with a fuel injection valve for port injection used to inject fuel into the intake passage (or intake port) in addition to the fuel injection valves for in-cylinder injection like the above-described fuel injection valves 7, a passage branching from the middle of the low pressure fuel passage 4 may be arranged to supply low pressure fuel to a delivery pipe for port injection.

A pulsation damper 11 is provided in the middle of the aforementioned low pressure fuel passage 4. The pulsation damper 11 is used to damp the pulsation of fuel caused with the operation (i.e. sucking and discharging) of the aforementioned high pressure fuel pump 2. To the middle of the low pressure fuel passage 4 is connected the base end of a branch passage 8. The terminal end of the branch passage 8 is connected to the fuel tank 3. A pressure regulator 9 is provided in the middle of the branch passage 8. The pressure regulator 9 is adapted to open when the pressure (fuel pressure) in the low pressure fuel passage 4 exceeds a predetermined value, thereby returning surplus fuel in the low pressure fuel passage 4 to the fuel tank 3 through the branch passage 8.

A check valve 10 is provided in the middle of the high pressure passage 5. The check valve 10 is a one way valve that allows the flow from the discharge port of the aforementioned high pressure fuel pump 2 toward the aforementioned delivery pipe 6 and restricts the flow from the aforementioned delivery pipe 6 toward the discharge port of the aforementioned high pressure fuel pump 2.

To the aforementioned delivery pipe 6 is connected a return passage 12 for returning surplus fuel in the delivery pipe 6 to the aforementioned fuel tank 3. A relief valve 13 for switching between opening and closing of the return passage 12 is provided in the middle of the return passage 12. The relief valve 13 is an electric or electromagnetic valve mechanism that is opened when the fuel pressure in the delivery pipe 6 exceeds a target value.

To the middle of the aforementioned return passage is connected the terminal end of a communication passage 14. The base end of the communication passage is connected to the aforementioned high pressure fuel pump 2. The communication passage 14 is a passage for letting surplus fuel discharged from the aforementioned high pressure fuel pump 2 flow into the return passage 12.

The fuel injection control system according to this embodiment has an ECU 15 that electrically controls the above-described components. The ECU is an electronic control unit including a CPU, a ROM, a RAM, and a backup RAM etc. The ECU 15 is electrically connected with various sensors such as a fuel pressure sensor 16, an intake air temperature sensor 17, an accelerator position sensor 18 and a crank position sensor 19.

The fuel pressure sensor 16 is a sensor that outputs an electrical signal correlating with the fuel pressure in the delivery pipe 6 (or the discharge pressure of the high pressure fuel pump). The intake air temperature sensor 17 outputs an electrical signal correlating with the temperature of air taken into the internal combustion engine. The accelerator position sensor 18 outputs an electrical signal correlating with the amount of operation of the accelerator pedal (or the accelerator opening degree). The crank position sensor 19 is a sensor that outputs an electrical signal correlating with the rotational position of the output shaft (or the crankshaft) of the internal combustion engine.

The ECU 15 controls the low pressure fuel pump 1 and the inlet valve 2a based on signals output from the above-described various sensors. For instance, the ECU adjusts the opening/closing timing of the inlet valve 2a in such a way that the signal output from the fuel pressure sensor 16 (i.e. the actual fuel pressure) converges to a target value. In this process, the ECU 15 feedback-controls duty cycle Dh (i.e. the ratio of the energized period and the non-energized period in a solenoid) as a control value of the inlet valve 2a based on the difference between the actual fuel pressure and the target value. Specifically, the ECU 15 performs a proportional-integral control (PI control) of the duty cycle Dh of the inlet valve 2a based on the difference between the actual fuel pressure and the target value. The target value mentioned above is a value that is set in relation to the desired fuel injection quantity of the fuel injection valve 7.

In the above-described proportional-integral control, the ECU 15 calculates the duty cycle Dh by adding a control value (or feed forward term) Tff determined according to the desired fuel injection quantity, a control value (or proportional term) Tp determined according to the difference between the actual fuel pressure and the target value (which will be hereinafter referred to as the "fuel pressure difference") and a control value (or integral term) Ti obtained by integrating a part of the difference between the actual fuel pressure and the target value.

The relationship between the aforementioned fuel pressure difference and the feed forward term and the relationship between the aforementioned fuel pressure difference and the proportional term Tp shall be determined in advance by an adaptation process utilizing an experiment etc. The proportion of the aforementioned fuel pressure difference to be added to the integral term Ti shall also be determined in advance by an adaptation process utilizing an experiment etc.

The calculation of the duty cycle Dh of the inlet valve 2a by the ECU 15 in this way embodies the control section according to the present invention.

The ECU 15 executes a process (lowering process) of lowering the discharge pressure (or feed pressure) of the low pressure fuel pump 1 in order to reduce the power consumption in the low pressure fuel pump 1 as much as possible. Specifically, the ECU 15 calculates the discharge pressure of the low pressure fuel pump 1 (i.e. the drive signal Dl for the low pressure fuel pump 1) according to the following equation (1):

$$Dl = Dlold + \Delta Ti \cdot F - Cdwn \quad (1),$$

where Dlold is the previous value of the drive signal Dl, ΔTi is a change in the integral term Ti used in the above-described proportional-integral control (e.g. the difference between the integral term Tiold used in the last calculation of the duty cycle Dh and the integral term Ti used in this calculation: Ti−Tiold), F is a correction factor, and Cdwn is a lowering constant. When the change ΔTi in the integral term Ti is a positive value, an increasing factor Fi larger than 1 shall be used as the correction factor F, and when the change ΔTi is a negative value, a decreasing factor Fd smaller than 1 shall be used as the correction factor F.

If the drive signal Dl for the low pressure fuel pump 1 is determined according to the above equation (1), the drive signal Dl for the low pressure fuel pump 1 will increase (namely, the discharge pressure will rise) when the aforementioned integral term Ti exhibits an increasing tendency (ΔTi>0), and the drive signal Dl for the low pressure fuel pump 1 will decrease (namely, the discharge pressure will fall) when the aforementioned integral term Ti exhibits a decreasing tendency (ΔTi<0). In consequence, the discharge pressure of the low pressure fuel pump 1 can be decreased while preventing a suction failure in the high pressure fuel pump 2.

If a failure in the fuel injection system including the high pressure fuel pump 2 (e.g. break in wire harness, binding of the inlet valve 2a, or plunger sticking) occurs, a discharge failure will be caused in the high pressure fuel pump 2. However, during the execution of the above-described lowering process, the fuel pressure in the low pressure fuel passage 4 might be lower than the saturation vapor pressure of fuel due to a decrease in the discharge pressure of the low pressure fuel pump 1. If this is the case, fuel vapor will be generated in the low pressure fuel passage 4. In consequence, a suction failure will occur in the high pressure fuel pump, and a discharge failure will also occur in the high pressure fuel pump 2 correspondingly.

Therefore, when a discharge failure in the high pressure fuel pump 2 occurs during the execution of the above-described lowering process, it is necessary to determine whether the failure is caused by a failure in the fuel injection system or by fuel vapor in the low pressure fuel passage 4.

In the fuel injection control system for an internal combustion engine according to this embodiment, when a discharge failure in the high pressure fuel pump 2 occurs, a pressure increasing process for increasing the discharge pressure of the low pressure fuel pump 1 is performed, and thereafter a process for detecting a discharge failure in the high pressure fuel pump 2 is executed again.

In the following, how the failure detection process in this embodiment proceeds will be described.

Figure 2:
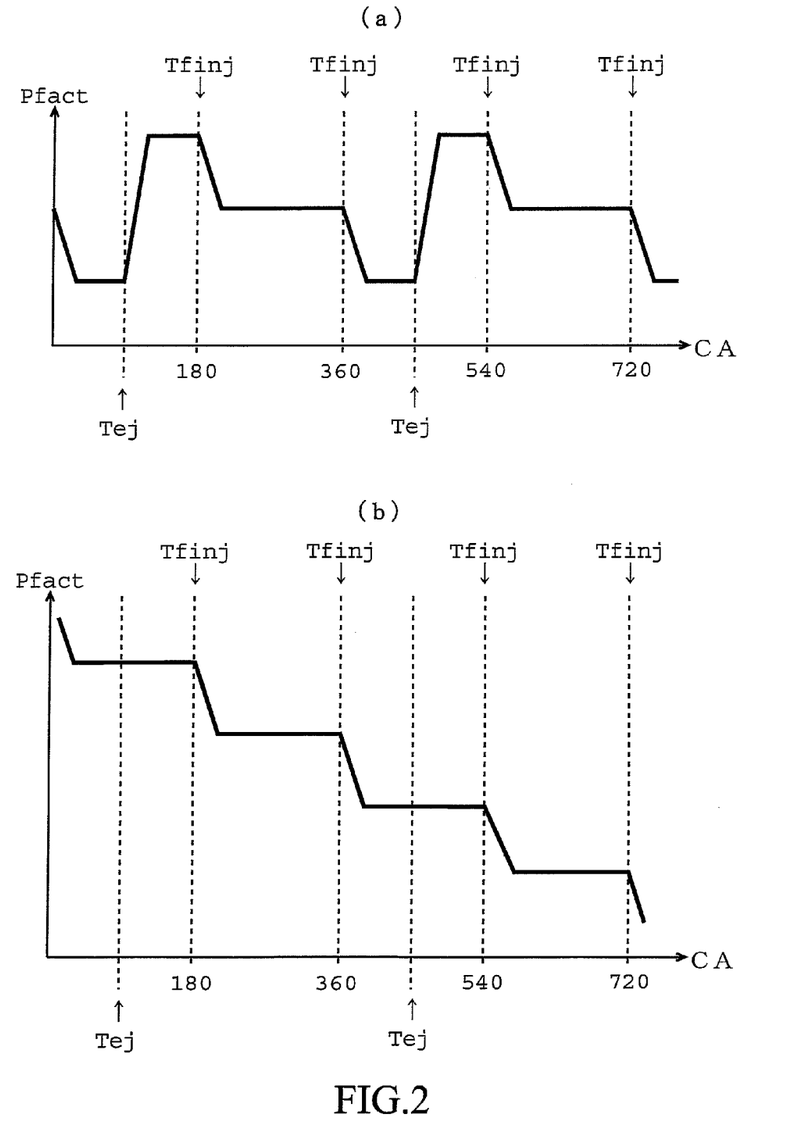
FIG. 2 shows the change in the actual fuel pressure Pfact in relation to the rotational position (CA) of the crank shaft in a case where the time of discharge Tej and the time of fuel injection Tfinj do not overlap.

Firstly, the ECU 15 detects a discharge failure in the high pressure fuel pump 2 based on the amount of change in the measurement value of the fuel pressure sensor 16 in relation to the operation timing (discharge timing) of the high pressure fuel pump 2. FIG. 2 shows the change in the measurement value of the fuel pressure sensor 16 (i.e. the actual fuel pressure Pfact) in relation to the rotational position (CA) of the crankshaft. In FIG. 2, Tej indicates the timing of operation (discharge) of the high pressure fuel pump 2, and Tfinj indicates the timing of operation (fuel injection) of the fuel injection valve 7. In the illustrative case shown in FIG. 2, the high pressure fuel pump 2 is adapted to discharge fuel every 360 degrees of crankshaft rotation CA (i.e. one discharge per fuel injection for two cylinders). However, the high pressure fuel pump 2 may be adapted to discharge fuel every 180 degrees of crankshaft rotation CA (i.e. one discharge per fuel injection for one cylinder).

When a discharge failure does not occur in the high pressure fuel pump 2, the actual fuel pressure will increase at the time of discharge Tej from the high pressure fuel pump 2 and decrease at the time of fuel injection Tfinj, as seen in graph (a) in FIG. 2. In contrast, when a discharge failure occurs in the high pressure fuel pump 2, the actual fuel pressure will increase little at the time of discharge Tej from the high pressure fuel pump 2, as seen in graph (b) in FIG. 2. Therefore, the ECU 15 may determine that a discharge failure occurs in the high pressure fuel pump 2 if the amount of increase ΔPfact in the actual fuel pressure Pfact during a predetermined period of time after the time of discharge Tej of the high pressure fuel pump 2 is lower than a specific value.

The "predetermined period of time" mentioned above may be, for example, equal to a time taken for the fuel discharged from the high pressure fuel pump 2 to reach the delivery pipe 6 when no discharge failure occurs in the high pressure fuel pump 2. This predetermined period of time is determined in advance by an adaptation process utilizing an experiment etc. The "specific value" is a value equal to the smallest value among the possible values of the amount of increase ΔPfact in the actual fuel pressure Pfact during the above-mentioned predetermined period of time while no discharge error occurs in the high pressure fuel pump. This specific value is determined in advance by an adaptation process utilizing an experiment etc.

Figure 3:
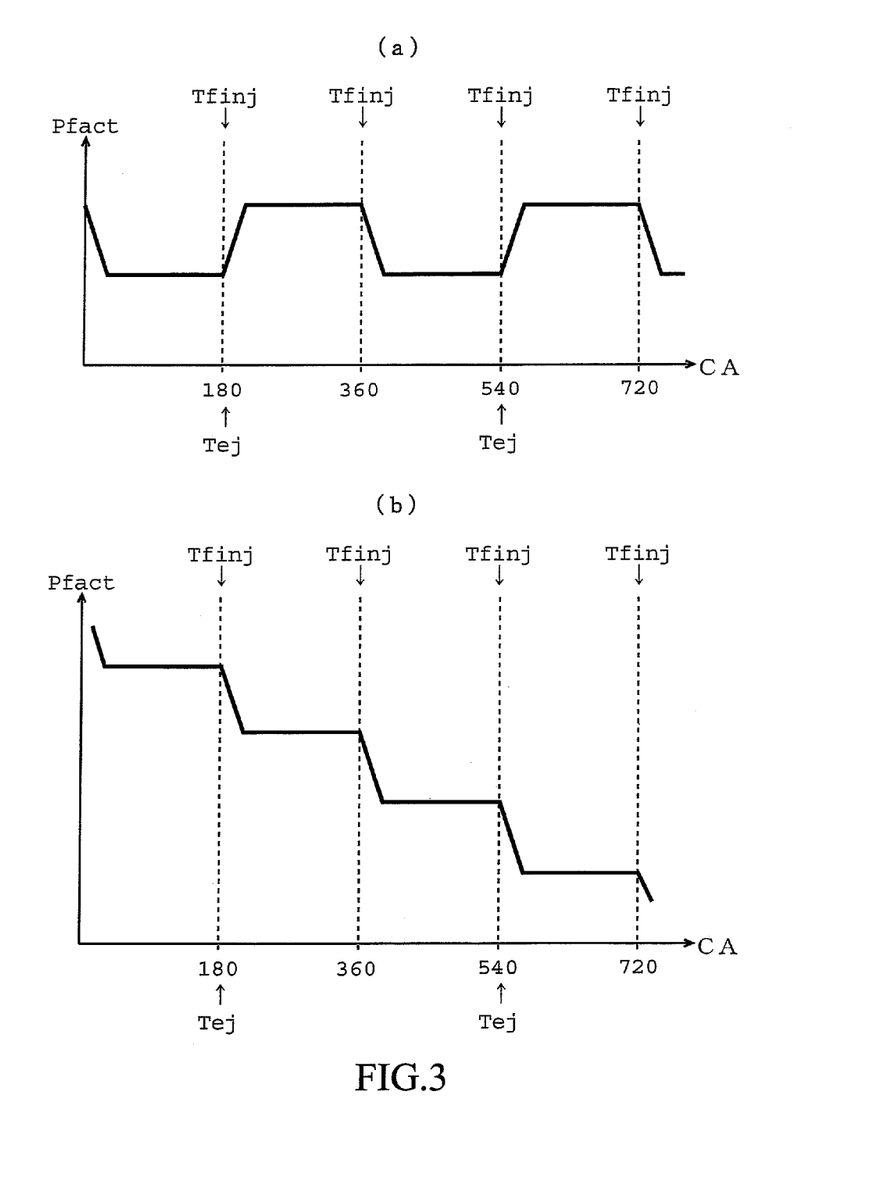
FIG. 3 shows the change in the actual fuel pressure Pfact in relation to the rotational position (CA) of the crank shaft in a case where the time of discharge Tej and the time of fuel injection Tfinj overlap.

In the illustrative case shown in FIG. 2, the time of discharge Tej from the high pressure fuel pump 2 and the time of fuel injection Tfinj from the fuel injection valve 7 do not overlap. However, there may be cases where the time of discharge Tej and the time of fuel injection Tfinj overlap (including cases where the discharge period and the fuel injection period partly overlap). FIG. 3 shows the change in the actual fuel pressure Pfact in relation to the rotational position (CA) of the crankshaft in a case where the discharge timing Tej and the fuel injection timing Tfinj are synchronized with each other.

When no discharge failure occurs in the high pressure fuel pump 2, the actual fuel pressure will increase at the time of discharge Tej as seen in graph (a) in FIG. 3. On the other hand, when a discharge failure occurs in the high pressure fuel pump 2, the actual fuel pressure will not increase at the time of discharge Tej but decrease with fuel injection as seen in graph (b) in FIG. 3.

Therefore, the ECU 15 may determine that a discharge failure occurs in the high pressure fuel pump 2 if the amount of increase ΔPfact in the actual fuel pressure Pfact during the predetermined period of time after the time of discharge Tej of the high pressure fuel pump 2 is lower than the specific value. In connection with this, the amount of increase ΔPfact during the time in which no discharge failure occurs in the high pressure fuel pump 2 is smaller in the case where the time of discharge Tej and the time of fuel injection Tfinj overlap than in the case where the time of discharge Tej and the time of fuel injection Tfinj do not overlap. Therefore, it is preferred that the specific value be set smaller in the case where the time of discharge Tej and the time of fuel injection Tfinj overlap than in the case where the time of discharge Tej and the time of fuel injection Tfinj do not overlap. It is more desirable that the specific value set in the case where the time of discharge Tej and the time of fuel injection Tfinj overlap be varied using as parameters the discharge quantity of the high pressure fuel pump 2 and the quantity of fuel injection through the fuel injection valve 7.

If the ECU 15 determines that a discharge failure occurs in the high pressure fuel pump 2, the process of increasing the discharge pressure of the low pressure fuel pump 1 (pressure increasing process) is executed. The amount of increase in this process is set in such a way that the fuel pressure in the low pressure fuel passage 4 becomes sufficiently higher than the saturation vapor pressure of fuel. This amount of increase is determined in advance by an adaptation process utilizing an experiment etc.

While the above-described pressure increasing process is executed, the ECU 15 calculates again the amount of increase ΔPfact in the actual fuel pressure Pfact during the predetermined period of time after the time of discharge of the high pressure fuel pump 2 and determines whether or not the amount of increase ΔPfact thus calculated is smaller than the above-mentioned specific value.

If the cause of the discharge failure in the high pressure fuel pump 2 is fuel vapor, the discharge failure in the high pressure fuel pump 2 will be removed by the execution of the above-described pressure increasing process. On the other hand, if the cause of the discharge failure in the high pressure fuel pump 2 is a failure in the fuel injection system, the discharge failure in the high pressure fuel pump 2 will not be removed by the execution of the above-described pressure increasing process. Therefore, if the amount of increase ΔPfact calculated again during the execution of the above-described pressure increasing process is smaller than the specific value, the ECU 15 determines that the high pressure fuel pump is in failure. If the amount of increase ΔPfact calculated again during the execution of the above-described pressure increasing process is not smaller than the specific value, the ECU 15 determines that the high pressure fuel pump 2 is in order and that fuel vapor is generated in the low pressure fuel passage 4.

By executing the failure detection process in this way, a failure in the fuel injection system including the high pressure fuel 2 can be detected accurately. In other words, when a discharge failure in the high pressure fuel pump 2 occurs, it is possible to distinguish whether the cause of the failure is a failure in the fuel injection system or fuel vapor in the low pressure fuel passage 4.

In the case where the cause of a discharge failure in the high pressure fuel pump 2 is a failure in the fuel injection system, the ECU 15 notifies a user (e.g. the driver of the vehicle equipped with the internal combustion engine) of the occurrence of the failure. The way of this notification may be generating a warning sound through a speaker provided in the vehicle's cabin, turning on a warning lamp provided in the vehicle's cabin, or displaying a warning message on a display device provided in the vehicle's cabin. As the occurrence of a failure is notified by such means, the user can stop the operation of the internal combustion engine or drive the vehicle to a repair shop.

On the other hand, in the case where the cause of a discharge failure in the high pressure fuel pump 2 is fuel vapor in the low pressure fuel passage 4, the ECU 15 may executes the lowering process after making the target discharge pressure for the low pressure fuel pump 1 higher or changing the correction factor F (i.e. the increasing factor Fi and the decreasing factor Fd) used in the above-described lowering process and/or the lowering constant Cdwn and changing the lower limit of the target discharge pressure for the low pressure fuel pump 1.

For example, if the generation of fuel vapor in the low pressure fuel passage 4 is detected by executing the above-described failure detection process, the ECU 15 firstly terminates the pressure increasing process and the lowering process. Then, the ECU 15 executes a process (compensation process) of making the target discharge pressure for the low pressure fuel pump 1 higher by a certain amount. This compensation process is executed repeatedly until the discharge failure in the high pressure fuel pump 2 is removed. Thus, the target discharge pressure for the low pressure fuel pump 1 is increased stepwise until the failure in the high pressure fuel pump 2 is removed.

When the discharge failure in the high pressure fuel pump 2 is removed, the ECU 15 terminates the execution of the compensation process and restarts the execution of the lowering process. In doing so, the ECU restarts the lowering process with the correction factor F, the lowering constant Cdwn and the lower limit altered. Specifically, the ECU 15 makes the decreasing factor Fd and the lowering constant Cdwn smaller and the increasing factor Fi and the lower limit larger than those before the detection of the discharge failure in the high pressure fuel pump 2. Such alterations in the correction coefficient F, the lowering constant Cdwn and the lower limit allow the execution of the lowering process while preventing the reoccurrence of fuel vapor in the low pressure fuel passage 4 and a discharge failure in the high pressure fuel pump 2.

Figure 4:
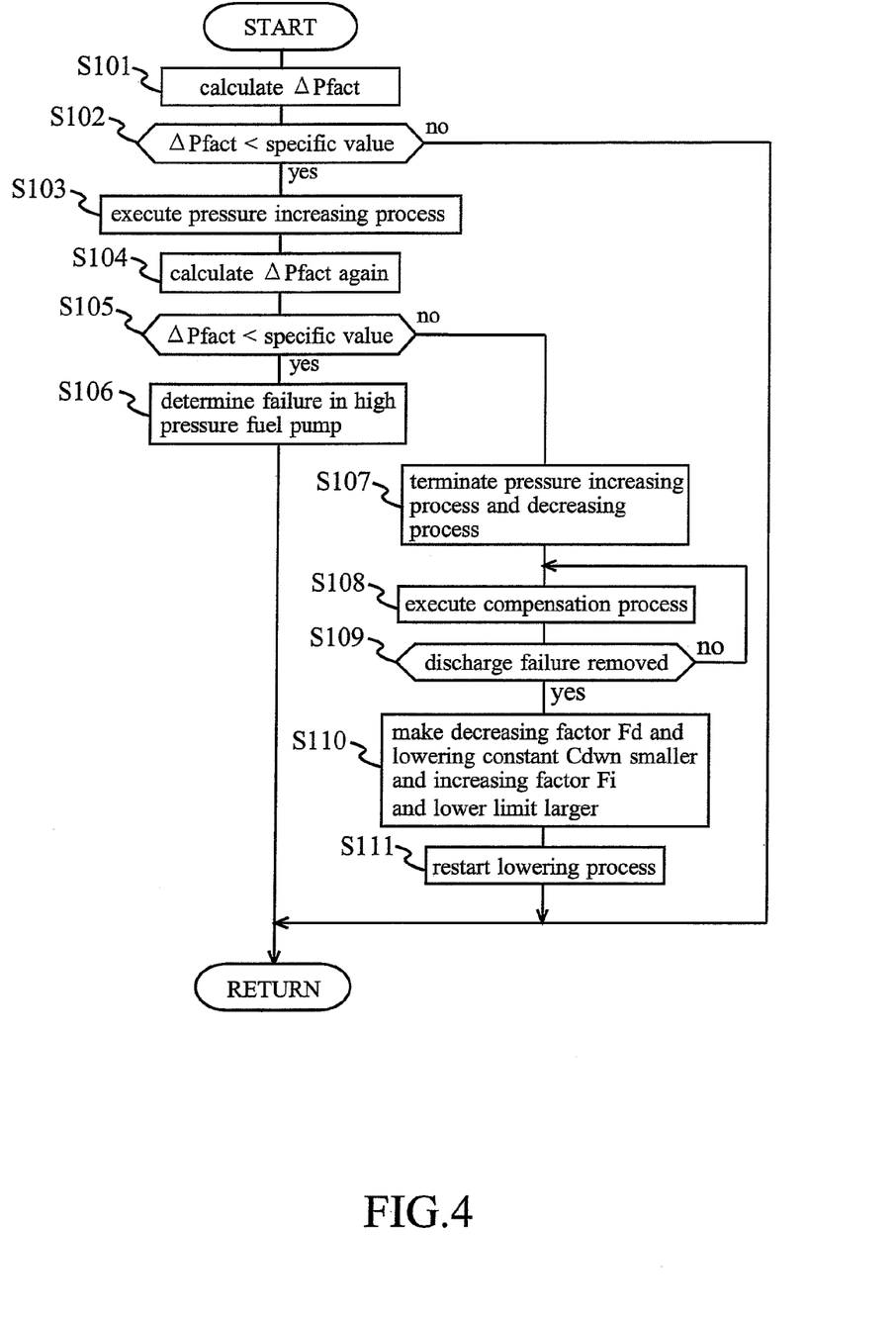
FIG. 4 is a flow chart of a failure detection process routine.

In the following, the procedure of execution of the failure detection process in this embodiment will be described with reference to FIG. 4. FIG. 4 is a flow chart of a failure detection process routine. The failure detection process routine is stored in the ROM of the ECU 15 in advance and executed periodically by the ECU 15 while the lowering process is executed.

In the failure detection routine, firstly in step S101, the ECU 15 calculates the amount of increase ΔPfact in the actual fuel pressure during the predetermined period of time after the time of discharge Tej. Specifically, the ECU 15 reads the measurement value of the fuel pressure sensor 16 (which will be hereinafter referred to as the "first fuel pressure") at the time when the rotational position of the crankshaft determined based on the measurement value of the crank position sensor 19 corresponds to the time of discharge Tej. Thereafter, the ECU 15 reads again the measurement value of the fuel pressure sensor (which will be hereinafter referred to as the "second fuel pressure") after the lapse of the predetermined period of time after the time at which the rotational position of the crankshaft corresponds to the time of discharge Tej. Then, the ECU 15 subtracts the first fuel pressure from the second fuel pressure to calculate the amount of increase ΔPfact.

In step S102, the ECU 15 determines whether or not the amount of increase ΔPfact calculated in step S101 is smaller than the specific value. If the amount of increase ΔPfact is not smaller than the specific value, a discharge failure in the high pressure fuel pump 2 is not occurring. Therefore, if the determination in step S102 is negative (ΔPfact specific value), the ECU 15 once terminates the execution of this routine.

On the other hand, if the amount of increase ΔPfact is smaller than the specific value, a discharge failure in the high pressure fuel pump 2 is occurring. Therefore, if the determination in step S102 is affirmative (ΔPfact<specific value), the ECU 15 makes a determination in steps S103 through S111 as to whether the discharge failure in the high pressure fuel pump 2 is caused by a failure in the fuel injection system or by fuel vapor in the low pressure fuel passage 4. The execution of the process of steps S101 through S102 by the ECU 15 embodies the detection section according to the present invention.

In step S103, the ECU 15 executes the pressure increasing process for making the target discharge pressure for the low pressure fuel pump 1 higher. In this process, the amount of increase in the target discharge pressure is set in such a way that the fuel pressure in the low pressure fuel passage 4 becomes sufficiently higher than the saturation vapor pressure of fuel. The execution of the process of step S103 by the ECU 15 embodies the pressure increasing section according to the present invention.

In step S104, the ECU 15 calculates again the amount of increase ΔPfact in the actual fuel pressure during the predetermined period of time after the time of discharge Tej. The way of calculation in this process is the same as the way of calculation of the amount of increase ΔPfact in the above-described step S101.

In step S105, the ECU 15 determines whether or not the amount of increase ΔPfact calculated in the above step S104 again is smaller than the specific value. The specific value mentioned here is equal to the specific value in the above step S102.

While the above-described pressure increasing process is executed, the fuel pressure in the low pressure fuel passage 4 is sufficiently higher than the saturation vapor pressure of fuel. Consequently, if the cause of the discharge failure in the high pressure fuel pump 2 is fuel vapor in the low pressure fuel pump 4, the amount of increase ΔPfact calculated again in the above step S104 will be larger than the specific value. On the other hand, if the cause of the discharge failure in the high pressure fuel pump 2 is a failure in the fuel injection system, the amount of increase ΔPfact calculated again in the above step S104 will be smaller than the specific value.

Therefore, if the amount of increase ΔPfact calculated again in the above step S104 is not smaller than the specific value, it may be concluded that the cause of the discharge failure in the high pressure fuel pump 2 is fuel vapor in the low pressure fuel passage 4. On the other hand, if the amount of increase ΔPfact calculated again in the above step S104 is smaller than the specific value, it may be concluded that the cause of the discharge failure in the high pressure fuel pump is a failure in the fuel injection system.

Thus, if the determination in the above step S105 is affirmative (ΔPfact<specific value), the ECU 15 proceeds to step S106, where it determines that the fuel injection system including the high pressure fuel pump 2 is in failure. In this process, the ECU 15 may notify the user of the failure in the fuel injection system. The execution of the process of steps S105 and S106 by the ECU 15 embodies the determination section according to the present invention.

On the other hand, if the determination in step S105 is negative (ΔPfact specific value), the ECU 15 proceeds to step S107. In step S107, the ECU 15 terminates the execution of the pressure increasing process and the lowering process.

In step S108, the ECU 15 executes a compensation process of making the target discharge pressure for the low pressure fuel pump 1 higher by a certain amount. The "certain amount" mentioned here is smaller than the amount of increase set in the above-described pressure increasing process to make the target discharge pressure for the low pressure fuel pump 1 higher. This "certain amount" is determined in advance by an adaptation process using an experiment etc. The execution of the process of step S108 by the ECU 15 embodies the compensation section according to the present invention.

In step S109, the ECU 15 determines whether or not the discharge failure in the high pressure fuel pump 2 has been removed. The method of determination in this process is the same as that adopted in the above steps S101 and S102 or steps S104 and S105. If the determination in step S109 is negative, the ECU 15 returns to the above step S108, where the ECU 15 executes the compensation process again, namely the ECU 15 further makes the target discharge pressure for the low pressure fuel pump 1 higher. This compensation process is executed repeatedly until the discharge failure in the high pressure fuel pump 2 is removed.

If the determination in the above step S109 is affirmative, the ECU 15 proceeds to step S110. In step S110, the ECU 15 alters the decreasing factor Fd, the increasing factor Fi, the lowering constant Cdwn and the lower limit used when executing the lowering process. Specifically, the ECU 15 makes the decreasing factor Fd and the lowering constant Cdwn smaller and the increasing factor Fi and the lower limit larger than those before the detection of the discharge failure in the high pressure fuel pump 2 in the above step S102.

In step S111, the ECU 15 restarts the execution of the lowering process using the decreasing factor Fd, the increasing factor Fi, the lowering constant Cdwn and the lower limit altered in step S110. Thus, it is possible to lower the discharge pressure of the low pressure fuel pump 1 while preventing the generation of fuel vapor in the low pressure fuel passage 4 and a discharge failure in the high pressure fuel pump 2.

According to the embodiment described above, in the fuel injection control system for an internal combustion engine equipped with a low pressure fuel pump and a high pressure fuel pump, it is possible to detect a failure in the high pressure fuel pump with high accuracy and to execute the lowering process while preventing a discharge failure in the high pressure fuel pump caused by fuel vapor in the low pressure fuel passage.

Embodiment 2

Next, a second embodiment of the fuel injection control system for an internal combustion engine according to the present invention will be described with reference to FIGS. 5 to 7. Here, the features different from those in the above-described first embodiment will be described, and the same features will not be described.

What is different in this embodiment from the above-described first embodiment is that a plurality of fuel injection systems including the high pressure fuel pump are provided. FIG. 5 is a diagram showing the basic configuration of the fuel injection control system for an internal combustion engine according to this embodiment. The fuel injection control system shown in FIG. 5 is a system to be applied to a V-type eight-cylinder internal combustion engine. The internal combustion engine is not limited to the V-type eight-cylinder internal combustion engine, but the system may be applied to any internal combustion engine equipped with a plurality of cylinder groups and fuel injection systems that are independently provided for the respective cylinder groups.

Figure 5:
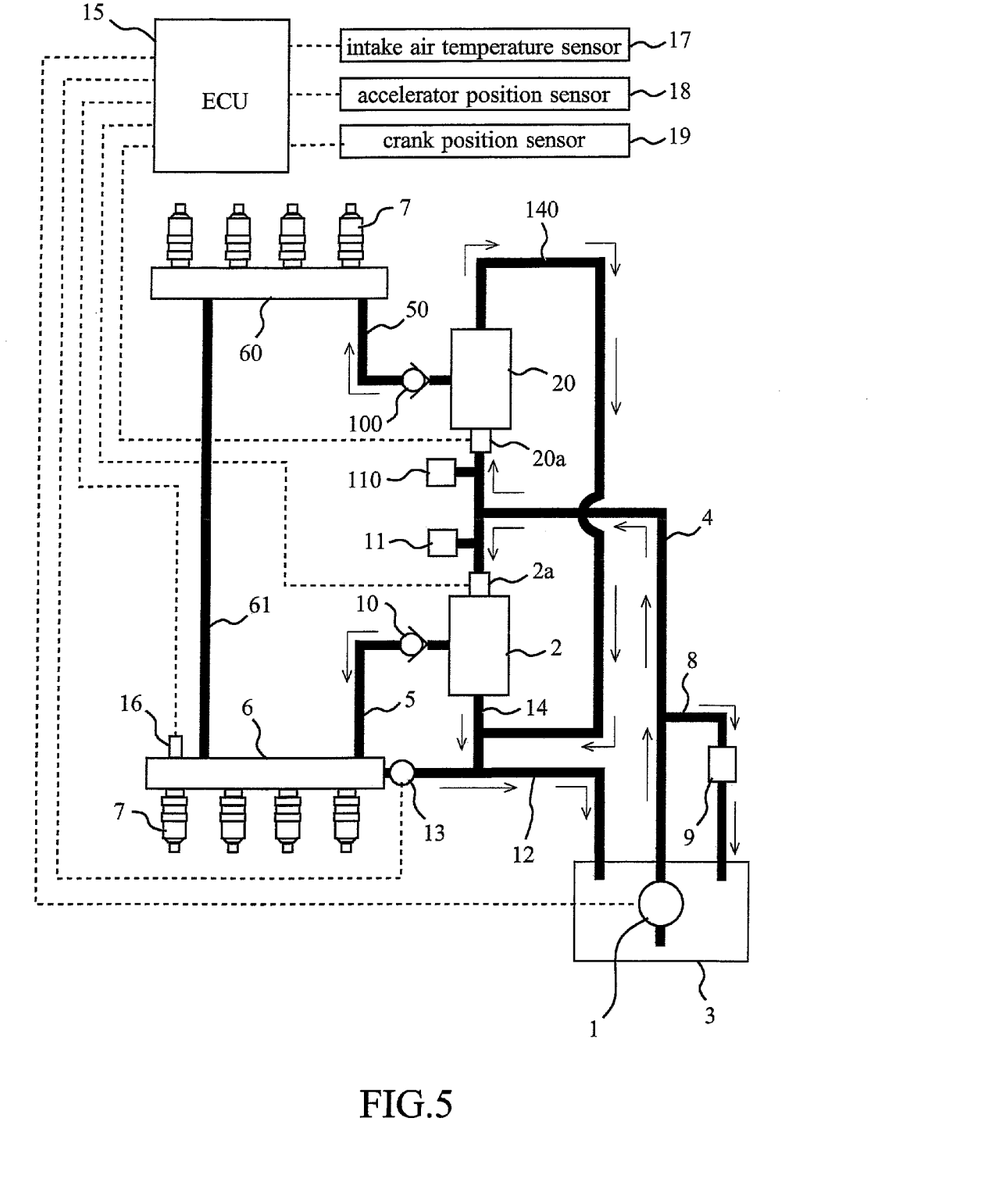
FIG. 5 is a diagram showing the basic configuration of a fuel injection control system for an internal combustion engine according to a second embodiment.

In FIG. 5, the low pressure fuel passage 4 bifurcates into two passages, which are connected to the inlet valves 2a, 20a of the two high pressure fuel pumps 2, 20 respectively. A first pulsation damper 11 and a second pulsation dumper 110 are provided respectively in the two passages branching from the low pressure fuel pump 4. In the following, one high pressure fuel pump 2 will be referred to as the first high pressure fuel pump 2, and the other high pressure fuel pump 20 will be referred to as the second high pressure fuel pump 20. Similarly, one inlet valve 2a will be referred to as the first inlet valve 2a, and the other inlet valve 20a will be referred to as the second inlet valve 20a.

The discharge port of the first high pressure fuel pump 2 is connected to a first delivery pipe 6 through a first high pressure fuel passage 5. A first check valve 10 is provided in the middle of the first high pressure fuel passage 5. Four fuel injection valves 7 are connected to the first delivery pipe 6. These four fuel injection valves 7 are valve mechanisms that inject fuel directly into the cylinders in one cylinder bank of the internal combustion engine.

The discharge port of the second high pressure fuel pump 20 is connected to a second delivery pipe 60 through a second high pressure fuel passage 50. A second check valve 100 is provided in the middle of the second high pressure fuel passage 50. Four fuel injection valves 7 are connected to the second delivery pipe 60. These four fuel injection valves 7 are valve mechanisms that inject fuel directly into the cylinders in the other cylinder bank of the internal combustion engine.

The first delivery pipe 6 and the second delivery pipe 60 are connected to each other by a pressure adjustment passage 61. The pressure adjustment passage is provided to eliminate a pressure difference between the first delivery pipe 6 and the second delivery pipe 60. That is to say, the fuel pressure in the first delivery pipe 6 and the fuel pressure in the second delivery pipe 60 are kept equal to each other by the pressure adjustment passage 61. Therefore, a fuel pressure sensor 16 is provided on only one of the first delivery pipe 6 and the second delivery pipe 60 (on the first delivery pipe 6, in the case illustrated in FIG. 5).

To the first delivery pipe 6 is connected a return passage 12 for returning surplus fuel in the first delivery pipe 6 to the aforementioned fuel tank 3. A relief valve 13 for switching between opening and closing of the return passage 12 is provided in the middle of the return passage 12. The relief valve 13 is an electric or electromagnetic valve mechanism that is opened when the fuel pressure in the delivery pipe 6 exceeds a target value.

To the middle of the aforementioned return passage 12 is connected a first communication passage 14 and a second communication passage 140. The first communication passage 14 is a passage for letting surplus fuel discharged from the first high pressure fuel pump 2 flow into the return passage 12. The second communication passage 14 is a passage for letting surplus fuel discharged from the second high pressure fuel pump 20 flow into the return passage 12.

In the fuel injection control system for an internal combustion engine having the above-described configuration, the ECU 15 controls the discharge pressures of the first high pressure fuel pump 2 and the second high pressure fuel pump 20 (i.e. the duty cycles Dh of the first inlet valve 2a and the second inlet valve 20a) in such a way that the measurement value of the fuel pressure sensor 16 converges to a target value.

If the discharge pressures of the two high pressure fuel pumps 2, 20 are controlled based on the measurement value of the one fuel pressure sensor 16, the measurement value of the fuel pressure sensor 16 (i.e. the actual fuel pressure) might converge to the target value even when a discharge failure occurs in one of the first high pressure fuel pump 2 and the second high pressure fuel pump 20. Specifically, there might be cases in which a discharge failure of one of the first high pressure fuel pump 2 and the second high pressure fuel pump 20 is compensated for by an increase in the discharge pressure of the other. In such cases, the operation of the internal combustion engine might be continued with the discharge failure in the first high pressure fuel pump 2 or the second high pressure fuel pump 20 undetected. Consequently, the high pressure fuel pump 2, 20 suffering from the discharge failure might be operated with insufficient lubrication, or the detection of the failure in the high pressure fuel pump 2, 20 might be delayed.

In the fuel injection control system for an internal combustion engine according to this embodiment, as with the above-described first embodiment, a discharge failure in the high pressure fuel pump 2, 20 is detected based on the amount of change in the measurement value of the fuel pressure sensor 16 in relation to the operation timing (or the discharge timing Tej) of each high pressure fuel pump 2, 20.

Figure 6:
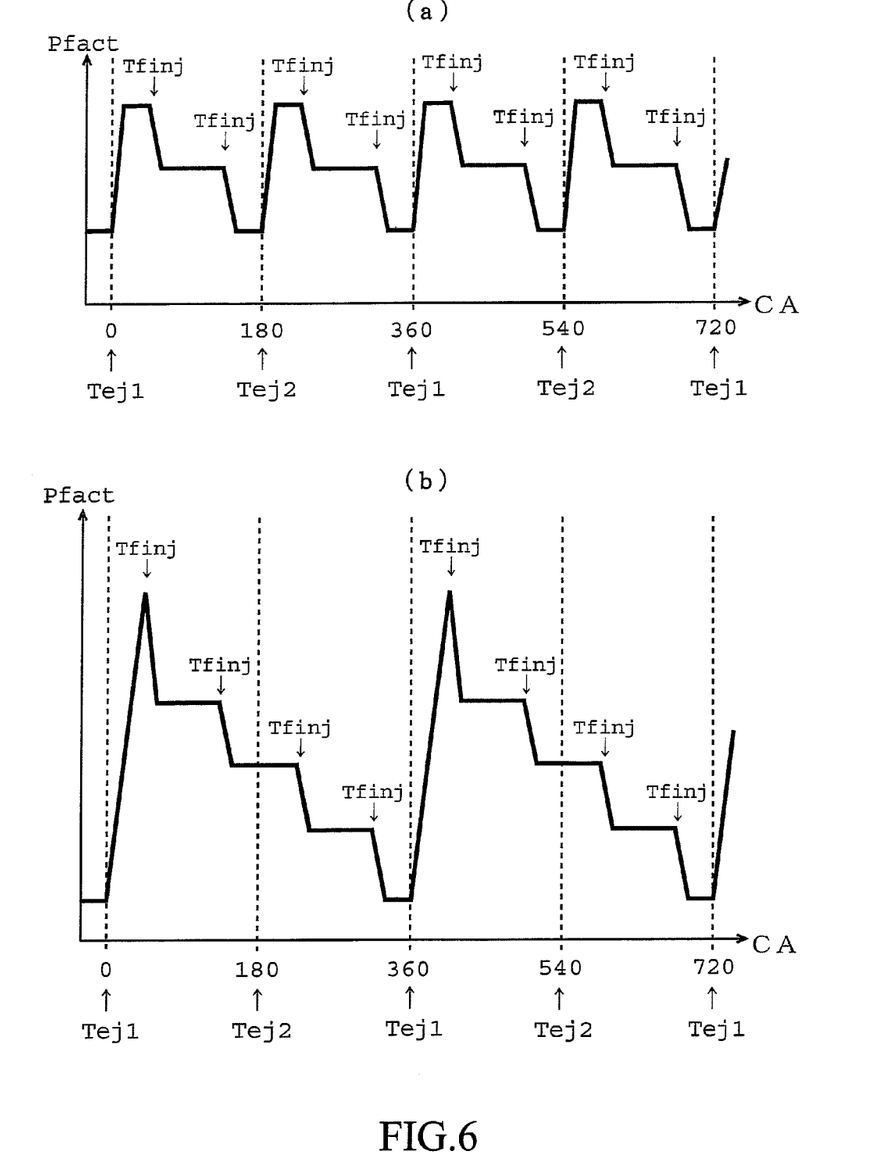
FIG. 6 shows the change in the actual fuel pressure Pfact in relation to the rotational position (CA) of the crank shaft in a case where the time of discharge Tej and the time of fuel injection Tfinj do not overlap.

FIG. 6 shows the change in the measurement value of the fuel pressure sensor 16 (i.e. the actual fuel pressure Pfact) in relation to the rotational position (CA) of the crankshaft in a case where the time of discharge Tej1, Tej2 of the high pressure fuel pumps 2, and the time of fuel injection Tfinj of the fuel injection valve 7 do not overlap. In FIG. 6, Tej1 indicates the timing of discharge of the first high pressure fuel pump 2, Tej2 indicates the timing of discharge of the second high pressure fuel pump 20. In FIG. 5, Tfinj indicates the timing of operation (fuel injection timing) of the fuel injection valve 7.

In the illustrative case shown in FIG. 6, the high pressure fuel pumps 2, 20 are adapted to discharge fuel every 360 degrees of crankshaft rotation CA (i.e. one discharge per fuel injection for two cylinders). However, the high pressure fuel pumps 2, 20 may be adapted to discharge fuel every 180 degrees of crankshaft rotation CA (i.e. one discharge per fuel injection for one cylinder).

When a discharge failure does not occur in the high pressure fuel pump 2, the actual fuel pressure will increase at the time of discharge Tej1, Tej2 from the high pressure fuel pump 2, 20 and decrease at the time of fuel injection Tfinj, as seen in graph (a) in FIG. 6. In contrast, when a discharge failure occurs in either one of the high pressure fuel pumps 2, 20, the actual fuel pressure will increase little at the time of discharge Tej1, Tej2 from one of the high pressure fuel pumps 2, 20, as seen in graph (b) in FIG. 6. Graph (b) in FIG. 6 is for a case in which a discharge failure occurs in the second high pressure fuel pump 20.

Therefore, the ECU 15 may determine that a discharge failure occurs in one of the high pressure fuel pumps 2, 20 if the amount of increase ΔPfact in the actual fuel pressure Pfact during a predetermined period of time after the time of discharge Tej1, Tef2 from one of the high pressure fuel pumps 2, 20 is lower than a specific value.

Figure 7:
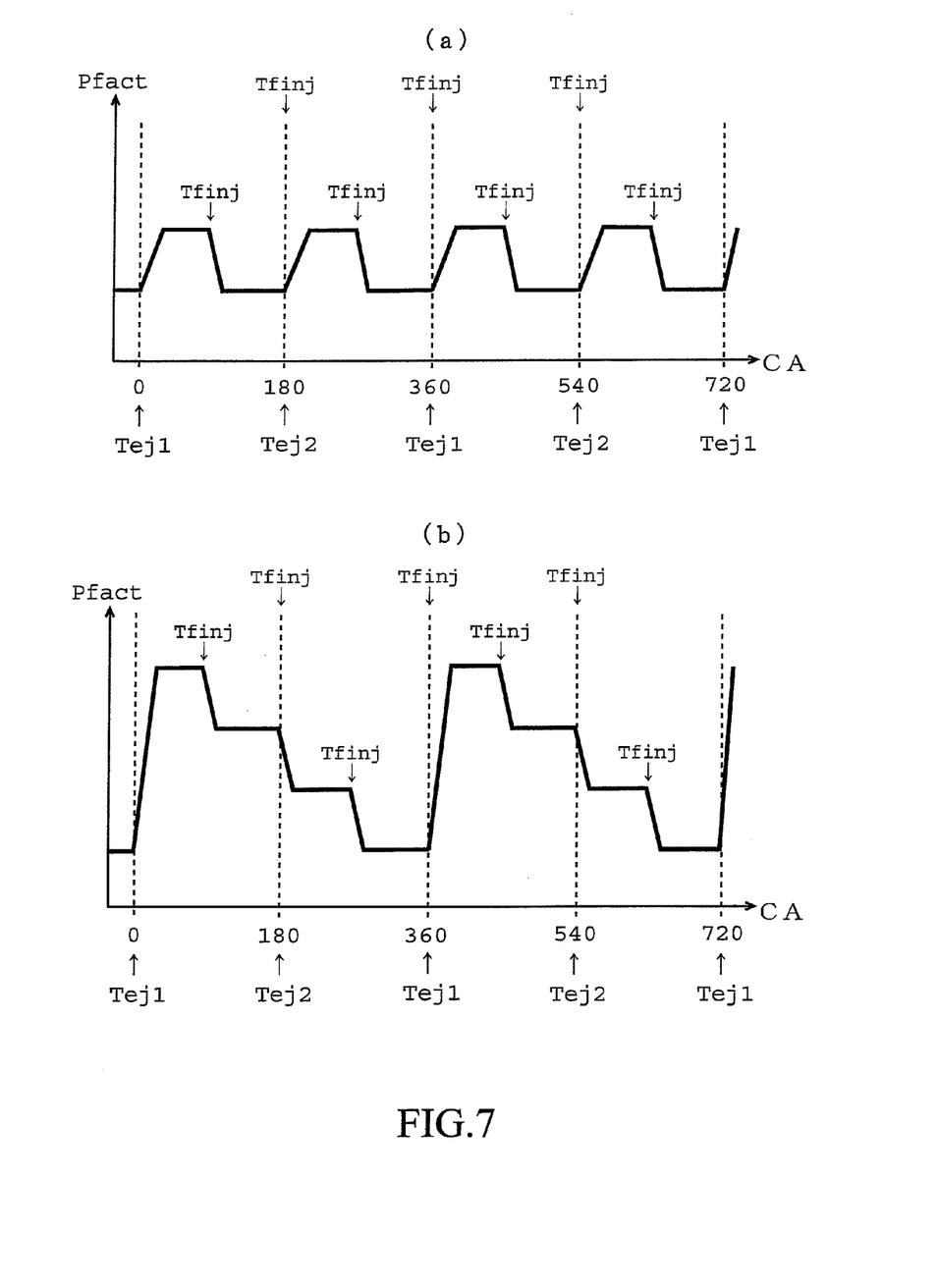
FIG. 7 shows the change in the actual fuel pressure Pfact in relation to the rotational position (CA) of the crank shaft in a case where the time of discharge Tej and the time of fuel injection Tfinj overlap.

FIG. 7 shows the change in the actual fuel pressure Pfact in relation to the rotational position (CA) of the crankshaft in a case where the time of discharge Tej1, Tej2 of the high pressure fuel pumps 2, and the time of fuel injection Tfinj of the fuel injection valve 7 are synchronized.

When no discharge failure occurs in the high pressure fuel pumps 2, 20, the actual fuel pressure will increase at the time of discharge Tej1, Tej2, as seen in graph (a) in FIG. 7. On the other hand, when a discharge failure occurs in one of the high pressure fuel pumps 2, 20, the actual fuel pressure will not increase at the time of discharge Tej1, Tej2 of one of the high pressure fuel pumps 2, 20 but decrease due to fuel injection. Graph (b) in FIG. 7 is for a case in which a discharge failure occurs in the second high pressure fuel pump 20.

Therefore, the ECU 15 may determine that a discharge failure occurs in one of the high pressure fuel pumps 2, 20 if the amount of increase ΔPfact in the actual fuel pressure Pfact during the predetermined period of time after the time of discharge Tej1. Tej2 of one of the high pressure fuel pumps 2, 20 is lower than the specific value.

In connection with this, the amount of increase ΔPfact during the time in which no discharge failure occurs in the high pressure fuel pumps 2, 20 is smaller in the case where the time of discharge Tej1, Tej2 and the time of fuel injection Tfinj overlap than in the case where the time of discharge Tej1, Tej2 and the time of fuel injection Tfinj do not overlap. Therefore, the specific value shall be set smaller in the case where the time of discharge Tej1, Tej2 and the time of fuel injection Tfinj overlap than in the case where the time of discharge Tej1, Tej2 and the time of fuel injection Tfinj do not overlap.

The process followed after the detection of a discharge failure in the first high pressure fuel pump 2 or the second high pressure fuel pump 20 is the same as that in the above-described first embodiment. Specifically, the ECU 15 increases the discharge pressure of the low pressure fuel pump 1 and thereafter executes again the process of detecting a discharge failure of the high pressure fuel pumps 2, 20, thereby distinguishing whether the cause of the discharge failure in the first high pressure fuel pump 2 or the second high pressure fuel pump 20 is a failure in the fuel injection system or fuel vapor in the low pressure fuel passage 4. If the cause of the discharge failure in the first high pressure fuel pump 2 or the second high pressure fuel pump 20 is fuel vapor in the low pressure fuel passage 4, the ECU 15 first executes the compensation process and secondly restarts the execution of the lowering process with the decreasing factor Fd, the increasing factor Fi, the lowering constant Cdwn and the lower limit altered.

According to the above-described embodiment, since a discharge failure in the first high pressure fuel pump 2 or the second high pressure fuel pump 20 can be detected at an early stage, a situation in which the high pressure fuel pump 2, 20 suffering from the discharge failure continues to be operated with insufficient lubrication can be prevented from occurring. In addition, it is possible to distinguish whether the cause of the discharge failure in the high pressure fuel pump 2, 20 is a failure in the fuel injection system or fuel vapor in the low pressure fuel passage 4. Furthermore, in the case where the cause of the discharge failure in the high pressure fuel pump 2, is fuel vapor in the low pressure fuel passage 4, it is possible to execute the lowering process while removing the discharge failure in the high pressure fuel pump 2, 20.

DESCRIPTION OF THE REFERENCE SIGNS

1: low pressure fuel pump
2: high pressure fuel pump (first high pressure fuel Pump)
2a: inlet valve (first inlet valve)
3: fuel tank
4: low pressure fuel passage
5: high pressure fuel passage (first high pressure fuel passage)
6: delivery pipe (first delivery pipe)
7: fuel injection valve
8: branch passage
9: pressure regulator
10: check valve
11: pulsation damper (first pulsation damper)
12: return passage
13: relief valve
14: communication passage
16: fuel pressure sensor
17: intake air temperature sensor
18: accelerator position sensor
19: crank position sensor
20: second high pressure fuel pump
20a: second inlet valve
50: second high pressure fuel passage
60: second delivery pipe
61: pressure adjustment passage
100: second check valve
110: second pulsation damper
140: second communication passage

The invention claimed is:

1. A fuel injection control system for an internal combustion engine in which fuel discharged from a low pressure fuel pump is supplied to a fuel injection valve with its pressure boosted by a high pressure fuel pump, comprising:
   a fuel pressure sensor that measures the pressure of fuel discharged from said high pressure fuel pump;
   a detection section that detects a discharge failure in said high pressure fuel pump, using as a parameter the amount of change in the measurement value of said fuel pressure sensor in relation to timing of operation of said high pressure fuel pump;
   a pressure increasing section that increases the discharge pressure of said low pressure fuel pump when said detection section detects a discharge failure in said high pressure fuel pump; and
   a determination section that determines that a fuel injection system including said high pressure fuel pump is in failure if said detection section detects a discharge failure in said high pressure fuel pump again after the discharge pressure of said low pressure fuel pump is increased by said pressure increasing section.

2. A fuel injection control system for an internal combustion engine according to claim 1 further comprising a plurality of delivery pipes that are interconnected, wherein said high pressure fuel pump is provided for each of said plurality of delivery pipes, said fuel pressure sensor is provided for any one of said plurality of delivery pipes, and said detection section detects a discharge failure in each of said plurality of high pressure fuel pumps, using as a parameter the amount of change in the measurement value of said fuel pressure sensor in relation to timing of operation of each of said plurality of high pressure fuel pumps.

3. A fuel injection control system for an internal combustion engine according to claim 1 further comprising a compensation section that makes a target discharge pressure for said low pressure fuel pump higher if said detection section does not detect again a discharge failure in said high pressure fuel pump after the discharge pressure of said low pressure fuel pump is increased by said pressure increasing section.

4. A fuel injection control system for an internal combustion engine according to claim 3 further comprising:
   a control section that feedback-controls a drive signal for said high pressure fuel pump in such a way that the discharge pressure of said high pressure fuel pump converges to a target pressure; and
   a correction section that performs increasing correction or decreasing correction of the target discharge pressure for said low pressure fuel pump in relation to the value of a correction term used in said feedback control,
   wherein after the target discharge pressure for said low pressure fuel pump is made higher by said compensation section, said correction section makes the amount of decreasing correction per unit time smaller than that before the target discharge pressure is made higher.

5. A fuel injection control system for an internal combustion engine according to claim 3 further comprising:
   a control section that feedback-controls a drive signal for said high pressure fuel pump in such a way that the discharge pressure of said high pressure fuel pump converges to a target pressure; and
   a correction section that performs increasing correction or decreasing correction of the target discharge pressure for said low pressure fuel pump in relation to the value of a correction term used in said feedback control,
   wherein after the target discharge pressure for said low pressure fuel pump is made higher by said compensation section, said correction section makes the amount of increasing correction per unit time larger than that before the target discharge pressure is made higher.

6. A fuel injection control system for an internal combustion engine according to claim 3 further comprising:
   a control section that feedback-controls a drive signal for said high pressure fuel pump in such a way that the discharge pressure of said high pressure fuel pump converges to a target pressure; and
   a correction section that performs increasing correction or decreasing correction of the target discharge pressure for said low pressure fuel pump in relation to the value of a correction term used in said feedback control,
   wherein after the target discharge pressure for said low pressure fuel pump is made higher by said compensation section, said correction section makes a lower limit of the target discharge pressure for said low pressure fuel pump higher than that before the target discharge pressure is made higher.

7. A fuel injection control system for an internal combustion engine according to claim 2 further comprising a compensation section that makes a target discharge pressure for said low pressure fuel pump higher if said detection section does not detect again a discharge failure in said high pressure fuel pump after the discharge pressure of said low pressure fuel pump is increased by said pressure increasing section.

8. A fuel injection control system for an internal combustion engine according to claim 7 further comprising:
   a control section that feedback-controls a drive signal for said high pressure fuel pump in such a way that the discharge pressure of said high pressure fuel pump converges to a target pressure; and
   a correction section that performs increasing correction or decreasing correction of the target discharge pressure for said low pressure fuel pump in relation to the value of a correction term used in said feedback control,
   wherein after the target discharge pressure for said low pressure fuel pump is made higher by said compensation section, said correction section makes the amount of decreasing correction per unit time smaller than that before the target discharge pressure is made higher.

9. A fuel injection control system for an internal combustion engine according to claim 7 further comprising:
   a control section that feedback-controls a drive signal for said high pressure fuel pump in such a way that the discharge pressure of said high pressure fuel pump converges to a target pressure; and
   a correction section that performs increasing correction or decreasing correction of the target discharge pressure for said low pressure fuel pump in relation to the value of a correction term used in said feedback control,
   wherein after the target discharge pressure for said low pressure fuel pump is made higher by said compensation section, said correction section makes the amount of increasing correction per unit time larger than that before the target discharge pressure is made higher.

10. A fuel injection control system for an internal combustion engine according to claim 7 further comprising:
   a control section that feedback-controls a drive signal for said high pressure fuel pump in such a way that the discharge pressure of said high pressure fuel pump converges to a target pressure; and
   a correction section that performs increasing correction or decreasing correction of the target discharge pressure for said low pressure fuel pump in relation to the value of a correction term used in said feedback control,
   wherein after the target discharge pressure for said low pressure fuel pump is made higher by said compensation section, said correction section makes a lower limit of the target discharge pressure for said low pressure fuel pump higher than that before the target discharge pressure is made higher.

* * * * *